(12) United States Patent
Garceau

(10) Patent No.: US 7,306,875 B2
(45) Date of Patent: Dec. 11, 2007

(54) BIPOLAR PLATE FOR A FUEL CELL

(75) Inventor: Patrick Garceau, Saint Pierre d'Autils (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 11/301,945

(22) Filed: Dec. 13, 2005

(65) Prior Publication Data

US 2006/0134502 A1   Jun. 22, 2006

(30) Foreign Application Priority Data

Dec. 16, 2004  (FR) .................................. 04 13391

(51) Int. Cl.
*H01M 8/04* (2006.01)
(52) U.S. Cl. .............................. 429/39; 429/36; 429/38
(58) Field of Classification Search ...................... None
See application file for complete search history.

(56) References Cited

U.S. PATENT DOCUMENTS 6,635,378 B1   10/2003   Yang et al.

2004/0209150 A1 *  10/2004  Rock et al. ..................... 429/38
2005/0031936 A1 *   2/2005  Joos ............................. 429/38

FOREIGN PATENT DOCUMENTS

| DE | 101 59 007 | 6/2003 |
| GB | 2 400 973 | 10/2004 |
| JP | 10 172594 | 6/1998 |
| WO | WO 02/075893 | 9/2002 |
| WO | WO 2004/102709 | 11/2004 |

* cited by examiner

*Primary Examiner*—John S. Maples
(74) *Attorney, Agent, or Firm*—Weingarten, Schurgin, Gagnebin & Lebovici LLP

(57) ABSTRACT

The invention relates to a bipolar plate for a fuel cell, the plate being made up of two half-plates assembled one against the other via their inside faces, each half-plate including in its inside face at least a first groove and a second groove that are spaced apart from each other. The bottoms of said grooves each presenting a plurality of orifices distributed along each groove and opening out into the outside face of the half-plate. The outside face of each half-plate includes a plurality of distribution channels, each distribution channel connecting a respective orifice of the first groove to a respective orifice of the second groove.

18 Claims, 7 Drawing Sheets

BIPOLAR PLATE FOR A FUEL CELL

This application claims priority to a French application No. 04 13391 filed Dec. 16, 2004.

FIELD OF THE INVENTION

The present invention relates to fuel cells and more particularly to distributor plates known as "bipolar plates" that serve to feed the electrodes of the fuel cell with reagent.

BACKGROUND OF THE INVENTION

A fuel cell typically comprises a set of individual cells each constituted by two electrodes (anode and cathode) separated by a member acting as an electrolyte and assembled to one another in series so as to form a stack. By feeding each electrode with suitable reagent, i.e. fuel for one of the electrodes and oxidizer for the other, an electrochemical reaction is obtained that enables a potential difference to be created between the electrodes, and thus enables electricity to be produced. The stack corresponds to the core of the fuel cell, since it is within the stack that the electrochemical reaction takes place that enables electricity to be generated.

In order to feed each electrode with reagent, specific interface elements are used that are generally referred to as "bipolar plates" and that are disposed on either side of each individual cell. These bipolar plates are generally in the form of a single component placed adjacent to the anode or cathode support. In general, the fluids are distributed within the stack by two pairs of channels disposed in each face of the plate, each pair serving to deliver and return or exhaust the inert fraction of the fluid in question. Holes made through the thickness of the plates provide local feeds and exhausts for pairs of channels that extend in a sinuous configuration so as to cover the entire active surface of the individual cell. Examples of such plates are described in particular in document FR 03/12718.

Nevertheless, that type of bipolar plate is designed to deliver pure reagents. The main preoccupation is to provide a sufficient quantity of reagent to feed each distribution channel in full. The use of pure reagent leads to a high operating cost for the fuel cell and poses problems of storage for the reagents, in particular for the hydrogen.

Consequently, attempts are being made to develop fuel cells that operate with reagent fluids that are less expensive and easier to use. In general, these fluids are mixtures of gases and contain, for the fuel: a hydrogen fraction; and for the oxidizer, an oxygen fraction. These fractions lie typically in the range 20% to 100%, with the other components being for the most part nitrogen, carbon dioxide, and water vapor. For example, in most air-breathing applications, hydrogen is produced by reforming a natural gas or a hydrocarbon, corresponding to a mixture of gases typically containing 40% hydrogen, with the remaining 60% being essentially nitrogen and carbon dioxide gas. The gas mixture used as an oxidizer is generally air, i.e. 21% oxygen, 78% nitrogen, and 1% rare gases.

Nevertheless, when using such gaseous mixtures with the above-mentioned bipolar plates, the fraction of the fuel or oxidizer contained in the gaseous mixture used decreases along its path within a distribution channel, and it must not be consumed in full before the end of the channel. Consequently, with the above-described bipolar plates designed for pure reagents, it is not possible to provide a uniform distribution of the reagent species over the entire working area of the membrane, thereby degrading the overall efficiency of the fuel cell and its lifetime.

OBJECT AND BRIEF SUMMARY OF THE INVENTION

An object of the present invention is to provide a bipolar plate design for a fuel cell that enables the reagent species (fuel/oxidizer) to be distributed in sufficient and uniform manner when using a mixture of gases that contains only a fraction of the reagent gas, and to do so without reducing the active distribution area of the plate.

In accordance with the invention, this object is achieved by the fact that the bipolar plate is made up of two half-plates assembled one against the other via their inside faces, each half-plate having in its inside face at least a first groove and a second groove that are spaced apart from each other, and in its outside face a plurality of distribution channels. The first and second grooves present a plurality of orifices opening out respectively into the ends of each of the distribution channels. The bipolar plate formed in this way by assembling together two half-plates has four grooves that extend under the outside faces of said bipolar plate, each of which outside faces includes the plurality of distribution channels.

Thus, with the bipolar plate design of the invention, it is possible to have bipolar plates with a larger number of channels compared with conventional bipolar plates. By increasing the number of channels formed in the outside face of each half-plate, the length of the path to be followed by the reagent gas flow is reduced correspondingly. These channels can be reduced down to the length corresponding to the distance between the two grooves (the most direct path). It is then possible to adapt the length of the distribution channels to the reagent content of the gaseous mixture used. With such bipolar plates, it is no longer essential to make use of flows having a high concentration of reagent or to increase gas flow rates.

In addition, in the bipolar plate of the invention, the feed and exhaust grooves for the distribution channels, which must be relatively wide in order to conserve a section of sufficient size in spite of the small thickness of the half-plate, are formed in the inside faces of the half-plates. This avoids any risk of losing support for the membrane on which the outside faces of the half-plates come to bear.

In an aspect of the invention, each of the first and second grooves in each half-plate presents a section that decreases progressively from an opening in the half-plate with which it communicates. This shape of groove serves to match the decrease in the flow rate of the fluid along the groove between the inlet of the groove and the orifices furthest away therefrom. It also serves to optimize the disposition of the grooves in the bipolar plate when the two half-plates are united. By way of example, the first and second grooves of each half-plate may present respective substantially triangular shapes that are reversed relative to each other.

With plates of relatively long length, at least one of the first and second grooves may present a shape in the form of two oppositely-directed triangles meeting via their narrow ends in the middle of the plate, the opposite ends of the two triangles forming two distinct feed inlets for the groove. This enables two inlets to be provided for a single groove and thus enables a larger quantity of fluid to be introduced therein.

In an aspect of the invention, each half-plate includes in its inside face a plurality of channels disposed between the first and second grooves, the channels of the two half-plates co-operating with one another to form a plurality of flow ducts for a cooling fluid.

The half-plates may be made of metal such as stainless steel or aluminum, possibly covered in anti-corrosion coating. The half-plates are held one against the other by brazing or by a conductive adhesive.

Nevertheless, it is also possible for the half-plates to be made of a non-metallic material and to be held one against the other by a conductive adhesive.

The half-plates may also be held one against the other by a clamping force exerted by the means for clamping the stack. Sealing between two half-plates is then provided by a gasket held in a groove machined in the inside face of the half-plate.

The two half-plates constituting the bipolar plate of the invention may be identical, thereby further rationalizing manufacturing costs, or else they may be different in order to be adapted to distributing two fluids at different concentrations.

The invention also provides a fuel cell including at least one individual cell formed of first and second electrodes separated by a membrane (electrolyte) disposed between two bipolar plates as defined above. The fuel cell may be of the proton exchange membrane type (PEMFC).

BRIEF DESCRIPTION OF THE DRAWINGS

Other characteristics and advantages of the invention appear from the following description of particular embodiments of the invention given as non-limiting examples, with reference to the accompanying figures, in which.

DETAILED DESCRIPTION OF AN EMBODIMENT

The present invention provides a design for a bipolar plate that enables reagent gas to be distributed uniformly, particularly when using a mixture of gases that comprises only a fraction of the reagent gas, as is the case for example when using air (oxygen source) or when using a reformate gas (hydrogen source). To compensate for the depletion in reagent of a gas mixture compared with a pure reagent gas, the invention proposes bipolar plates having distribution channels in larger numbers than in prior art bipolar plates. Channel length can thus be shortened in proportion to the number of channels provided on the bipolar plate. By reducing channel length, the distance to be traveled by the gaseous mixture is shortened, and consequently the depletion of the mixture in reagent prior to leaving the channels is reduced. The length of each channel is determined as a function of the concentration of reagent present in the gas mixture used, i.e. this length is determined so that the reagent present in the gas mixture has not been consumed completely before the end of its travel along the active surface of the electrode. As described in greater detail below, the bipolar plate of the invention satisfies these requirements without that degrading the active area and the volume of the bipolar plate, nor the head loss in the hydraulic circuit, nor the quality of membrane retention.

The invention applies preferably, but not necessarily, to a fuel cell of the type having a proton exchange membrane (PEMFC).

Figure 1A:
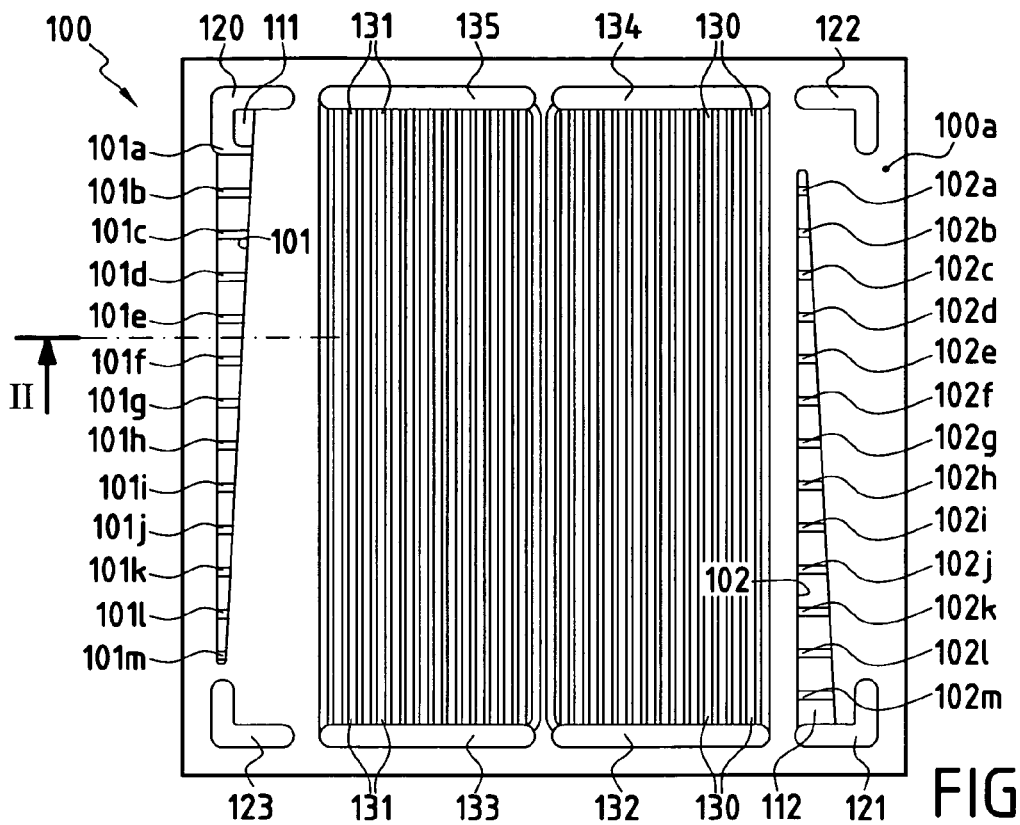
FIGS. 1A and 1B are respectively an inside face view and an outside face view of an embodiment of a half-plate in accordance with the invention.

The bipolar plate of the present invention is made by assembling together two half-plates. FIGS. 1A, 1B, 2, and 3 show an embodiment of a half-plate as used for making the bipolar plate of the invention. FIG. 1A shows a half-plate 100 seen looking at its inside face 100a, i.e. the face that faces the other half-plate once the bipolar plate has been made up. In its inside face 100a, the half-plate 100 has first and second grooves 101 and 102, each disposed in the vicinity of one of two opposite sides of the half-plate and opening out into a respective opening 120 (see FIG. 2) or 121, with a first series of channels 130 opening out into openings 132 and 134, and a second series of channels 131 opening out into openings 133 and 135 (see FIG. 2), the two series of channels 130 and 131 being disposed between the two grooves 101 and 102. The bottom 111 of the groove 101 presents a plurality of orifices 101a to 101m uniformly distributed along the entire length of the groove. Similarly, the bottom 112 of the groove 102 presents a plurality of orifices 102a to 102m uniformly distributed along said groove.

Figure 1B:
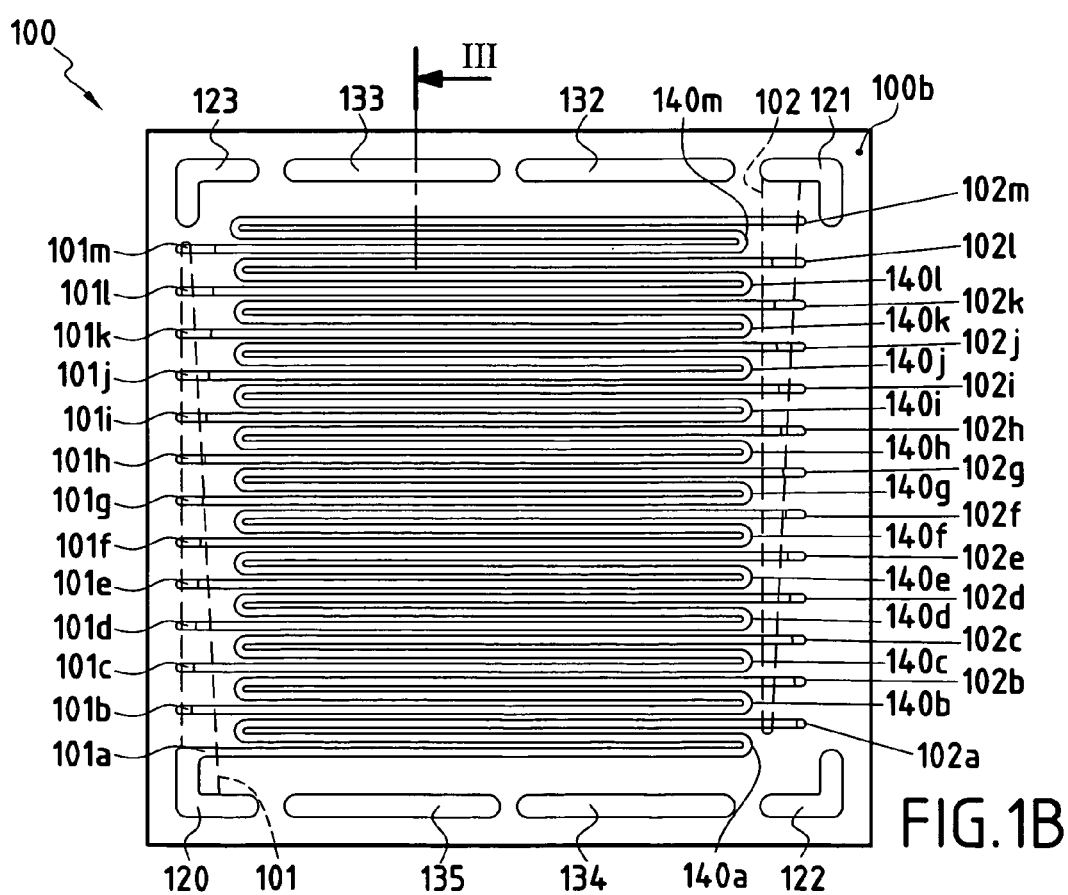
Figure 2:
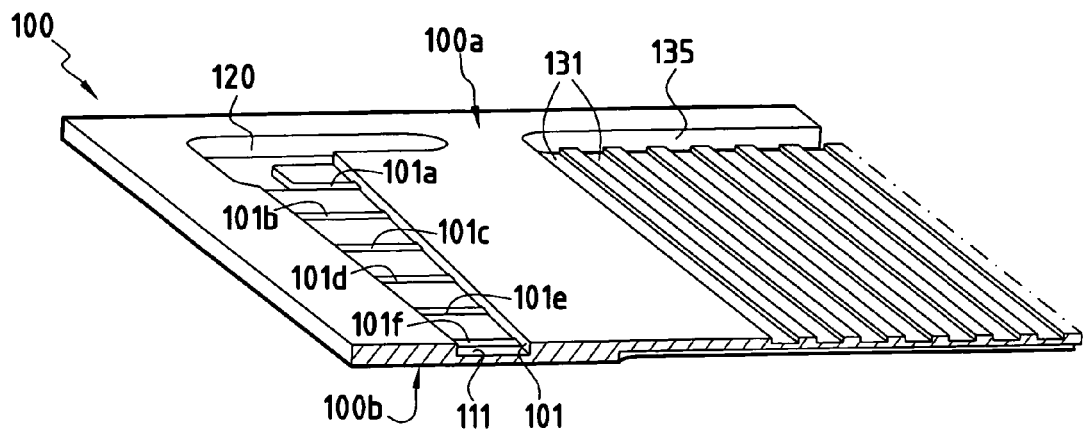
FIG. 2 is a fragmentary section view on section plane II in FIG. 1A.
Figure 3:
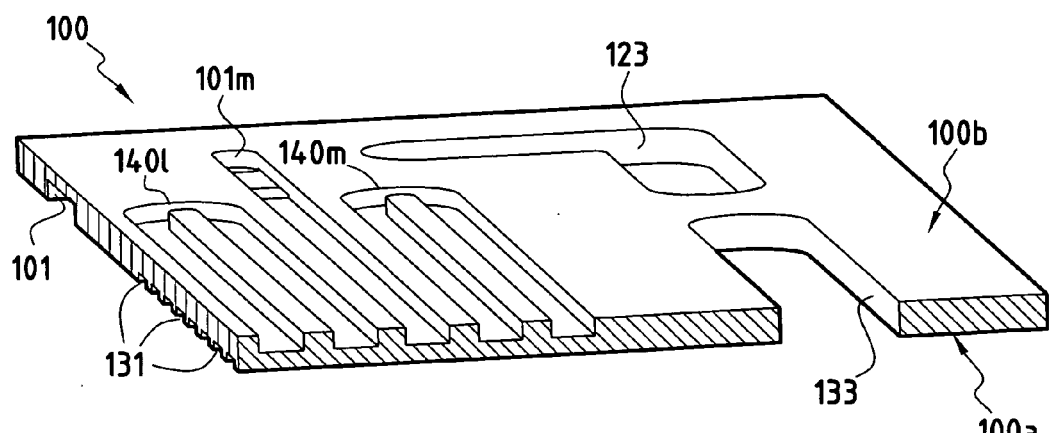
FIG. 3 is a fragmentary section view on section plane III in FIG. 1B.

FIGS. 1B and 3 show the outside face 100b of the half-plate 100, i.e. the face that is to press against the membrane of an individual cell in the fuel cell. In its outside face 100b, the half-plate 100 includes a plurality of distribution channels 140a to 140m. These channels are designed to feed one of the electrodes of the cell with reagent and they extend over a zone (working area) that corresponds substantially to the active area of the membrane of the cell over which the reagent is to be diffused. Each distribution channel connects a respective orifice in the groove 101 with a respective orifice in the groove 102. In FIG. 1B, each distribution channel 140a to 140m connects a respective one of the orifices 101a to 101m of the groove 101 to the corresponding orifice 102a to 102m in the groove 102. The distribution channels 140a to 140m thus form a plurality of parallel distribution channels, each having its own fluid injection orifice and its own fluid exhaust orifice. In other words, each half-plate of the invention has a feed groove and an exhaust groove for the reagent associated with parallel distribution channels via orifices that are specific to each distribution channel.

In the embodiment shown in FIG. 1B, each distribution channel comprises three rectilinear portions between an inlet orifice and an outlet orifice. Nevertheless, in the invention, it is possible to make distribution channels comprising a single portion between the inlet orifice and the outlet orifice, or indeed five or more portions.

Figure 4:
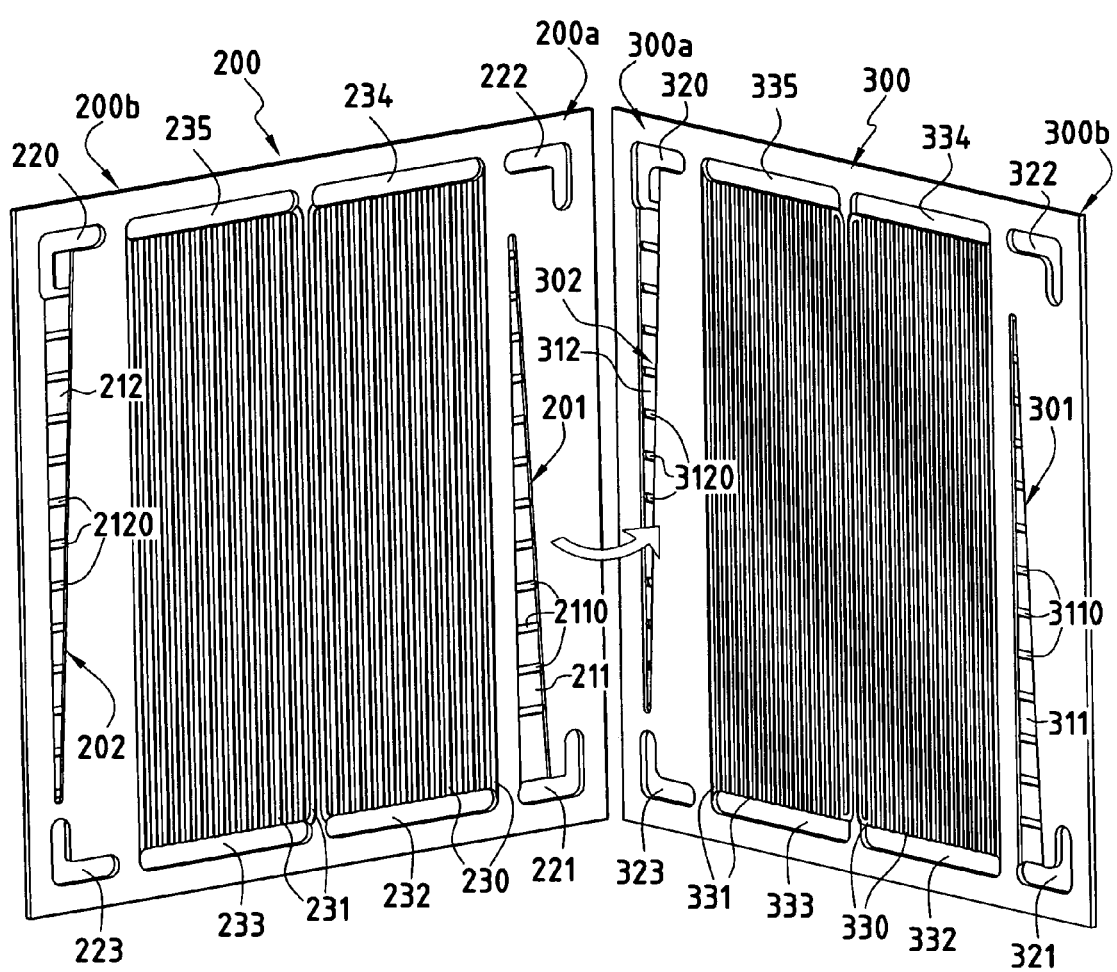
FIG. 4 is a perspective view of two half-plates prior to assembly of the bipolar plate in accordance with the invention.

FIG. 4 illustrates two half-plates being assembled together in order to obtain a bipolar plate of the invention. FIG. 4 shows two half-plates 200 and 300 of structure similar to the half-plate described with reference to FIGS. 1A, 1B, 2, and 3. Thus, like the half-plate 100 described above, each half-plate 200 or 300 presents on its inside face 200a or 300a respective first and second grooves 201, 301 and 202, 302 opening out into respective openings 221, 321 and 220, 320. The bottoms 211 and 311 of the grooves 201 and 301 present respective pluralities of orifices 2110 and 3110 that are uniformly distributed over the entire length of the groove. Similarly, the bottoms 212 and 312 of the grooves 202 and 302 respectively present respective pluralities of orifices 2120 and 3120 that are uniformly distributed along the corresponding groove.

The half-plates 200 and 300 also have first and second series of channels 230 and 330 opening out respectively into openings 232, 234 and 332, 334, and a second series of channels 231 and 331 opening out respectively into openings 233, 235 and 333, 335.

As shown in FIG. 4, a bipolar plate of the invention is obtained by assembling two half-plates 200 and 300 one against the other via their inside faces 200a and 300a. In the embodiment described here, the two half-plates are identical and each groove in one half-plate is closed by the solid surface portion of the other half-plate facing it. Nevertheless, the bipolar plate of the invention could be formed with half-plates presenting different structures. This would apply for example when the reagent concentrations in the gas mixtures distributed over the two outside faces of each bipolar plate are different. Under such circumstances, the number and the length of the distribution channels should be adapted independently for each half-plate as a function of the concentration of the reagent in the gaseous mixture that it is going to distribute.

As shown in FIG. 4, the grooves 201, 202, 301, and 302 are triangular in shape. The use of grooves of triangular or equivalent shapes with a section that varies along their length in each of the half-plates in accordance with the invention serves to respond to several problems simultaneously. The grooves in the two half-plates that are designed to be situated each other (in FIG. 4 the grooves 201 and 302 or the grooves 202 and 301) are of complementary shapes, thereby optimizing the space needed in each half-plate for forming the grooves. Furthermore, such a shape makes it possible to have a groove section that tapers progressively from the beginning of the groove where the flow for distributing is in service going towards its end. The flow containing the reagent introduced at the beginning of the groove is therefore continuously accelerated all the way to the end of the groove, thus making it possible to limit head losses and to distribute a substantially uniform quantity of flow into each orifice of the groove, even when the orifice is remote from the inlet to the groove.

Unlike the grooves, the channels 230, 231 and 330, 331 face one another and co-operate to form cooling fluid flow channels.

The half-plates of the present invention can be made from sheets of metal material such as stainless steel or aluminum, optionally covered in a final anti-corrosion coating (e.g. chemically deposited nickel). Consequently, the sheets, and thus the half-plates, are smaller in thickness than the plates known in the prior art. The half-plates of the invention can be of thickness lying in the range 1 millimeter (mm) to 1.5 mm, for example. This provides thin bipolar plates that serve to satisfy the requirements of reducing the total overall size and weight of a fuel cell, as is always desirable.

Having half-plates of such thicknesses implies a need for grooves that are relatively wide (several mm) in order to compensate for the limited depth they can have, and in order to retain a significant overall section. Nevertheless, such widening of the grooves can lead to a loss in support for the membrane over the groove, running a risk of the membrane being damaged given the combined stresses of pressure, temperature, vibration, etc. that the fuel cell will encounter during its life. Membrane breakage can lead to a loss of sealing between the reagents which can considerably affect the operation of the fuel cell.

These risks are eliminated in the present invention by positioning the grooves in the inside faces of the half-plates that face each other when a bipolar plate is assembled, i.e. faces that do not come into contact with the membrane.

The reagent and cooling fluid feed and exhaust openings in the half-plates (e.g. openings 120 to 124 and 132 to 135 in the half-plate 100 in FIGS. 1A and 1B) can be made by stamping. The reagent distribution channels (e.g. channels 140a to 140m in the half-plate 100 of FIGS. 1A to 1B) formed in the outside faces of the half-plates can be formed by stamping or by high speed machining. The cooling fluid flow channels (e.g. channels 130 and 131 of half-plate 100 in FIGS. 1A and 1B) formed in the inside faces of the half-plates can be formed by stamping or by high speed machining. Finally, the reagent feed or exhaust grooves (e.g. grooves 101 and 102 in the half-plate 100 in FIGS. 1A and 1B) formed in the inside faces of the half-plates can be formed by chemical machining or by high speed machining.

It should be observed that the feed and exhaust orifices co-operating with the grooves (e.g. orifices 101a to 101m and 102a to 102m in the half-plate 100 of FIGS. 1A and 1B) are obtained by crossing the machined grooves in the inside face with the machined reagent distribution channels in the outside face, so that the sum of the depths in the machining is greater than the thickness of either half-plate.

The two half-plates are assembled together by brazing or by using a conductive adhesive.

The half-plates may also be made out of non-metallic materials such as impregnated graphite or carbon-based composite materials. Under such circumstances, the half-plates are obtained by molding or by high speed machining. The bipolar plate is obtained by sticking together two half-plates using a conductive adhesive.

Figure 8:
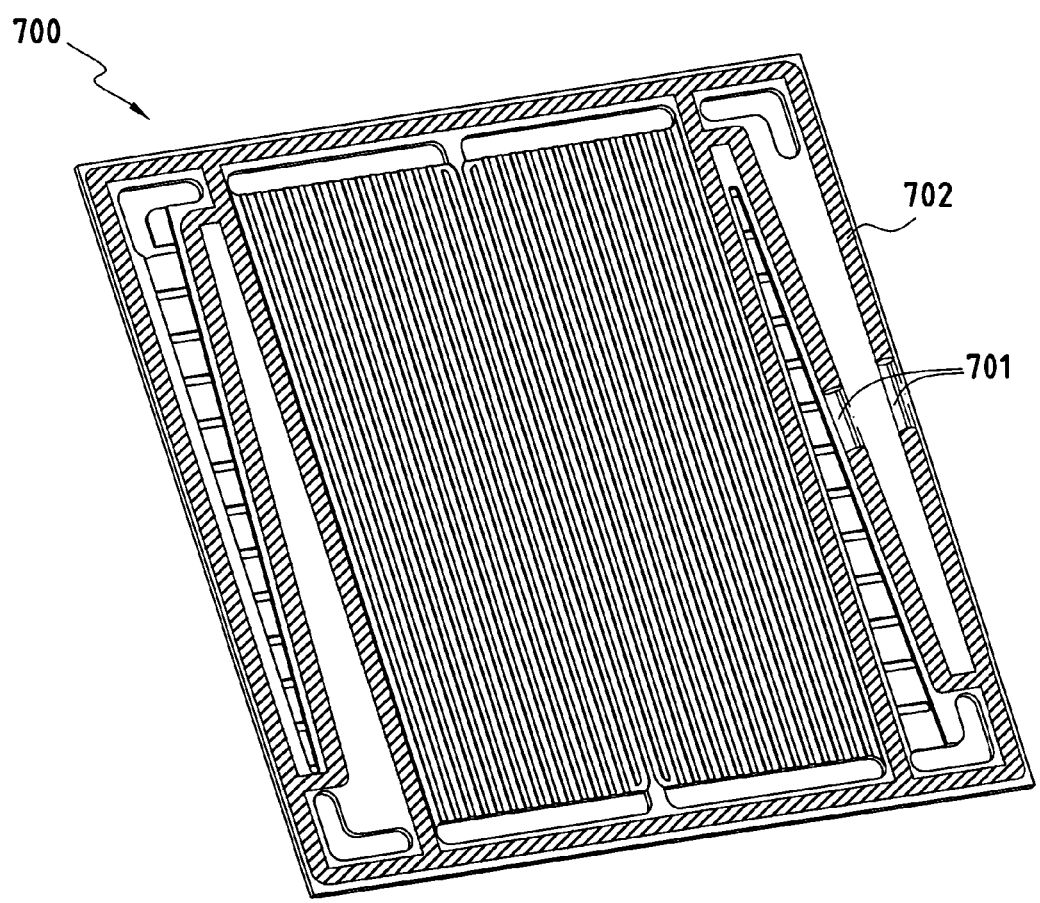
FIG. 8 is a view of the inside face of a half-plate fitted with a sealing gasket in accordance with the invention.

In another variant of the invention, the half-plates, whether of metallic or non-metallic material, can be held against each other merely by coming into contact under a clamping force generated on the entire stack of the fuel cell. In a manner that is well known in fuel cells, clamping means are used for keeping all of the elements of the stack (bipolar plates, individual cells, . . . ) in contact with one another with a predetermined level of force. Under such circumstances, sealing between two half-plates is provided both by the contact force and by a gasket interposed between the half-plates. FIG. 8 shows an embodiment of a half-plate 700 fitted with a sealing gasket 702 that may be made of elastomer, for example. The gasket 702 is received in part in a groove 701 machined in the inside surface of the plate 700. The portion of the gasket that projects from the groove 701 is received in a corresponding groove machined in the other half-plate that is to be assembled with the half-plate 700.

Figure 5:
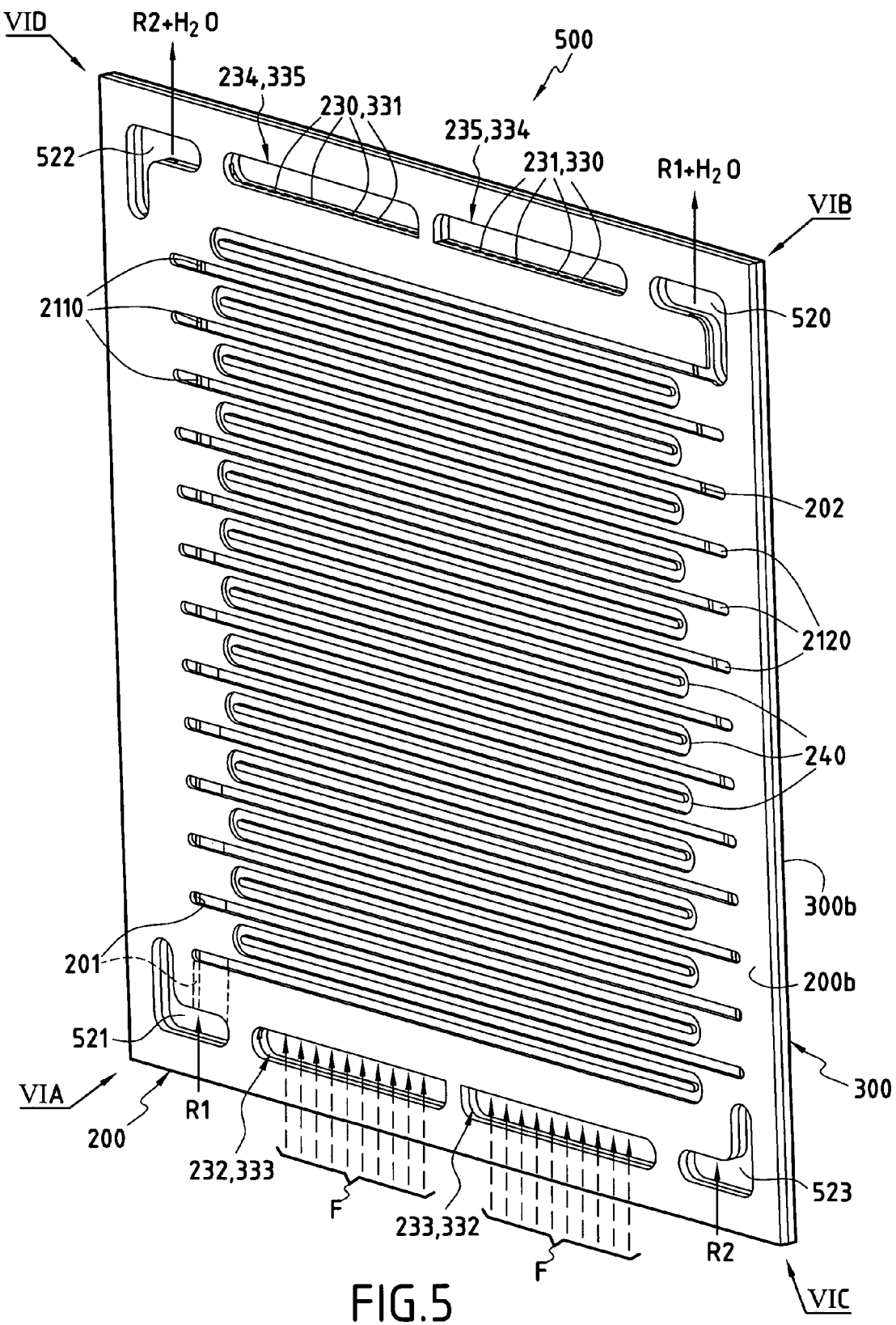
FIG. 5 is a perspective view of a bipolar plate obtained after assembling together the two half-plates of FIG. 4.

FIG. 5 shows a bipolar plate 500 obtained by assembling together the two half-plates 200 and 300 of FIG. 4. The resulting bipolar plate 500 has a first face that is visible in FIG. 5 that corresponds to the outside face 200b of the half-plate 200 and that includes a plurality of distribution channels 240, each connecting an orifice in the plurality of orifices 2110 of the groove 201 to an orifice of the plurality of orifices 2020 of the groove 202. The other face of the bipolar plate 500 (not shown in FIG. 5) corresponds to the outside face 300b of the half-plate 300, which likewise includes a plurality of distribution channels, each interconnecting one of the orifices of the plurality of orifices 3110 in the groove 301 to one of the orifices in the plurality of orifices 3120 of the groove 302 (cf. FIG. 4). Thus, each face of the bipolar plate 500 can distribute and exhaust a fluid independently of the other face.

Figure 6A:
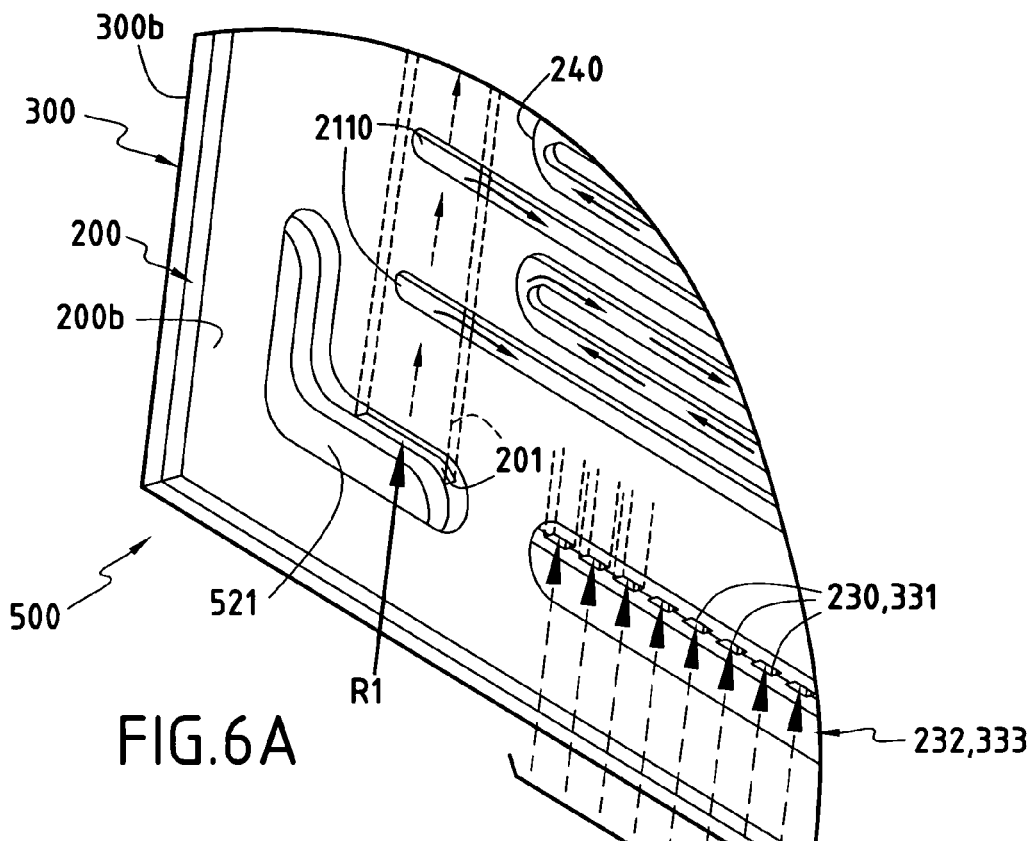
FIGS. 6A to 6D are detail views on a larger scale showing portions VIA to VID of the bipolar plate of FIG. 5.
Figure 6B:
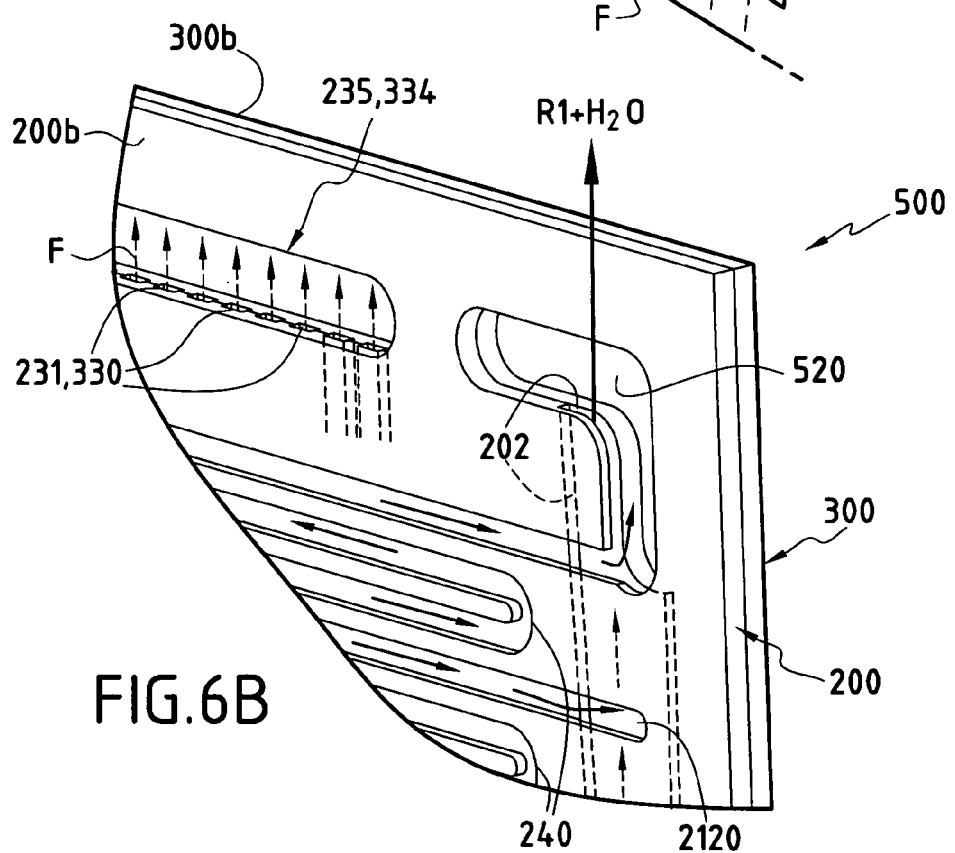
Figure 6C:
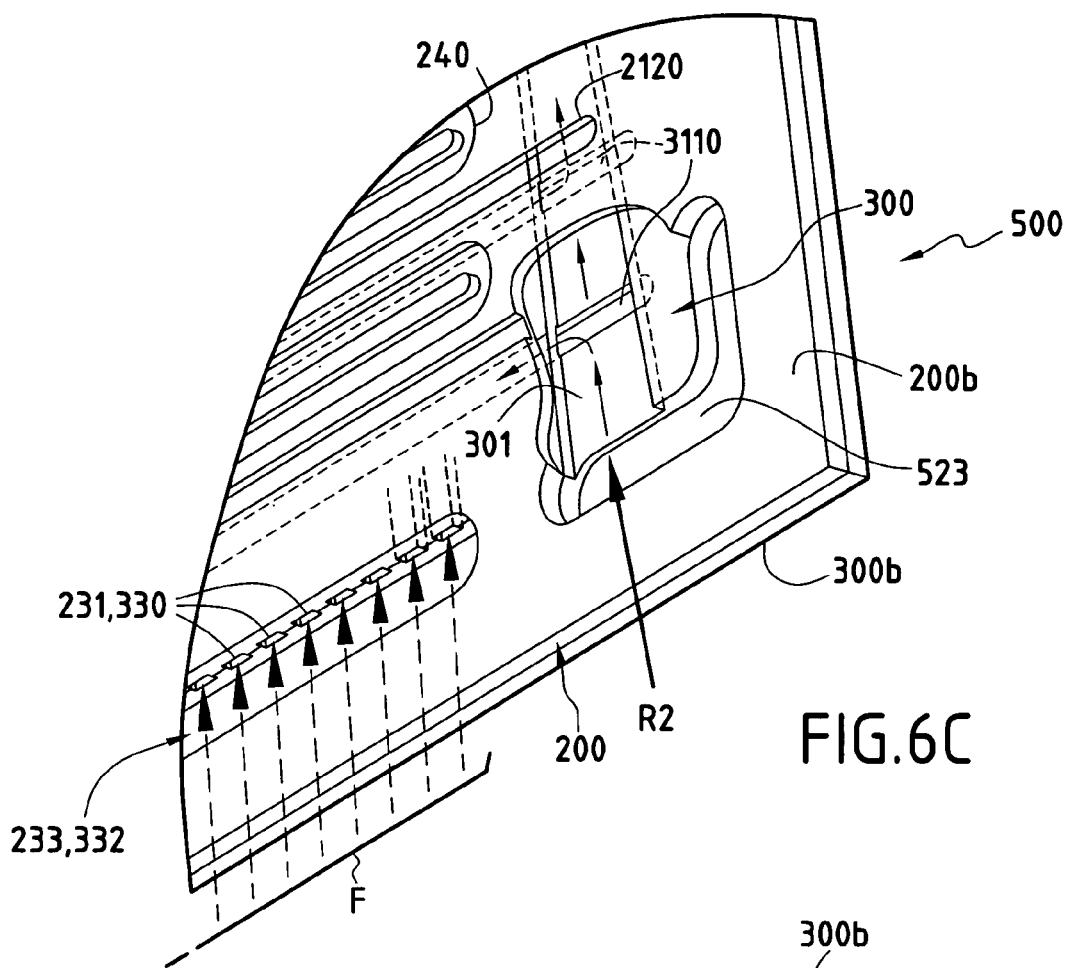
Figure 6D:
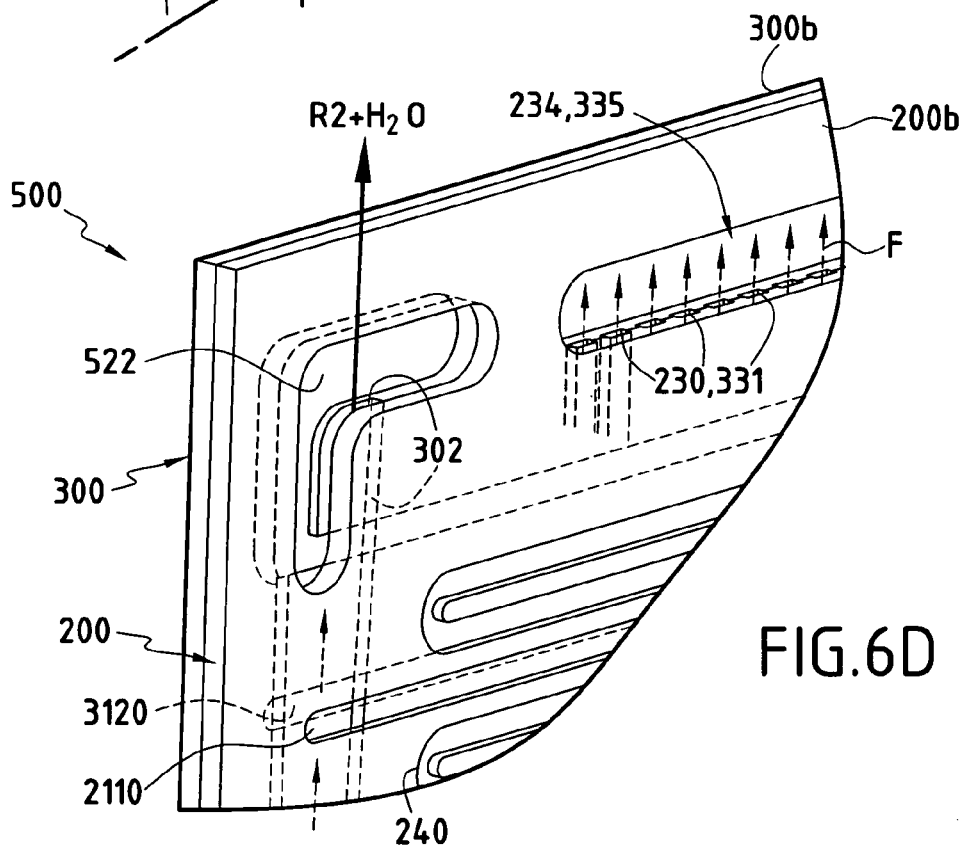

In the face 200b shown in FIG. 5, the groove 201 is fed with a reagent R1 through the opening 521 with which it is in communication, the opening 521 being formed by uniting the openings 221 and 323 in the half-plates 200 and 300. Each of the channels 240 receives a fraction of the reagent R1 via the orifices 2110 as shown in FIG. 6A. Each fraction of the reagent R1 flows in parallel in the channels 240. Excess reagent and a water produced by the electrochemical reaction then enter into the orifices 2120 to be exhausted via the groove 202 towards the opening 520 (union of the openings 220 and 322 in the half-plates 200 and 300), as shown in FIG. 6B. A reagent R2 is caused to flow in similar manner over the face 300b of the bipolar plate 500 by feeding the groove 301 via the opening 523 (one of the openings 223 and 321 in the half-plates 200 and 300) as shown in FIG. 6C, with excess reagent and any water that has been produced being exhausted via the groove 301 and the opening 522 (union of the openings 222 and 320 in the half-plates 200 and 300) as shown in FIG. 6D.

When the two half-plates 200 and 300 are assembled one against the other, the channels 230 and 231 present in the inside face 200a of each half-plate 200 co-operate respectively with the channels 331 and 330 present in the inside face 300a of the half-plate 300 to form internal flow ducts in the bipolar plate 500 in which it is possible to cause a cooling fluid to flow. The shape, the number, and the disposition of the internal flow ducts can vary, in particular as a function of the degree of cooling that it is desired to obtain.

Figure 7:
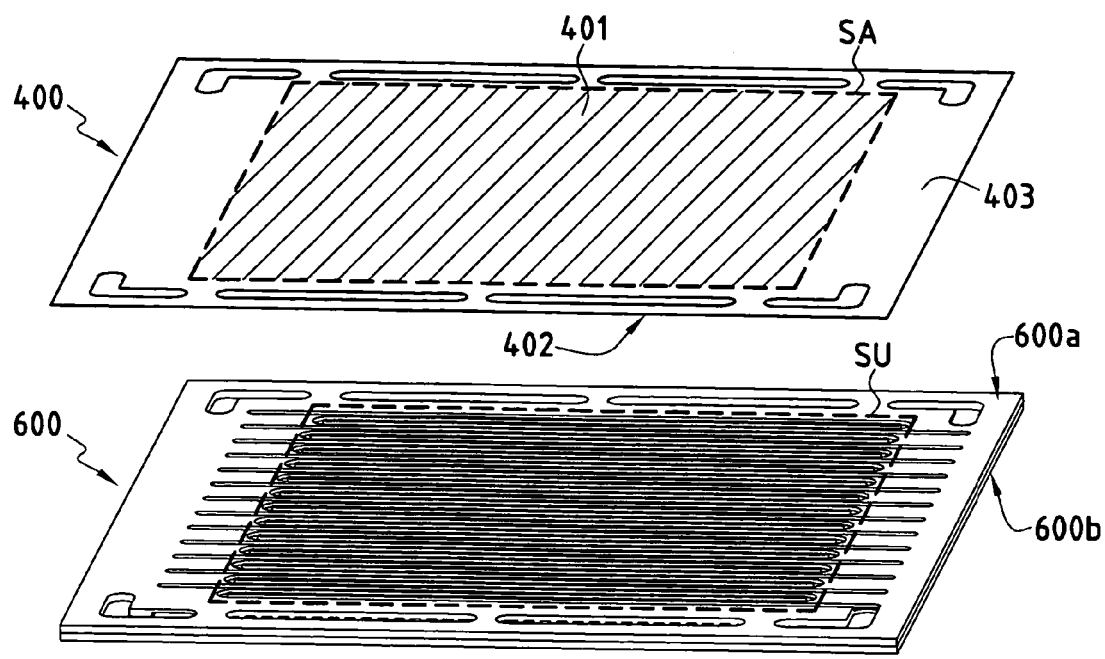
FIG. 7 is a diagrammatic perspective view of a fuel cell structure comprising bipolar plates of the invention.

FIG. 7 shows an example of a fuel cell structure comprising bipolar plates in accordance with the invention. In order to avoid overcrowding the drawing, the assembly shown in FIG. 7 corresponds to the minimum structure or stack that can be made when forming the core of a fuel cell, i.e. one individual cell 600 and a bipolar plate 400 identical to that shown in FIG. 5, and not described again in order to avoid pointlessly burdening the present description. Nevertheless, a fuel cell of the invention may naturally comprise the same structure several times over. Furthermore, when the structure of FIG. 7 corresponds to one end of the stack, only one single plane plate is placed on the opposite side of the individual cell, i.e. a plate which distributes reagent only over its face facing the cell.

The structure shown in FIG. 7 is made up of an individual cell 400 comprising a first electrode 401 and a second electrode 402 that are separated by a membrane 403 acting as an electrolyte, e.g. a proton exchange polymer membrane of the kind used in a PEMFC type fuel cell. These elements are assembled together and are presented in the form of a single component (EME) including the sealing gaskets (not shown). This portion of the structure of a fuel cell is well known in itself and is not described in greater detail. The present invention can be implemented with any type of individual cell.

For the electrochemical reaction to take place, each of the electrodes 401, 402 of the cell 400 needs to be fed with a different reagent, i.e. fuel in one of them, e.g. a reagent fluid containing hydrogen, and oxidizer in the other, e.g. air.

The electrode 402 is fed with a first reagent by e distribution channels 640 present in the face 600a of the bipolar plate 600 in the same manner as that described above in detail with reference to FIG. 5 and FIGS. 6A and 6B. Similarly, the electrode 401 is fed with a second reagent by the distribution channels in a bipolar plate of the following assembly of a bipolar plate and an individual cell or by the distribution channels of a bipolar plate if at the end of the stack. The distribution channels present in each outside face of the bipolar plates extend over a working area SU which corresponds substantially to the active area SA of the membrane in the cell 400. It can be seen that the bipolar plate of the invention enables fluid to be distributed over each of its faces via a greater number of parallel channels without significantly degrading the ratio between the active area of the membrane and the working area of the bipolar plates. This is due in particular to the fact that the bipolar plates of the invention have grooves and distribution channel feed and/or exhaust orifices that are disposed in optimized manner outside and below the working zone of the plate.

When the plates are long in the groove direction, it can happen that a single groove feed inlet is not sufficient, in particular for the inlets that are to feed distribution channels with fuel. Beyond a certain length for the grooves, and depending on the concentration of the reagent contained in the gaseous mixture used, there is a risk of the distribution channels furthest from the groove inlet not receiving any or enough reagent, thereby harming the uniformity of reagent distribution.

Under such circumstances, the grooves may have a section that varies symmetrically about an axis situated in the middle of the plate. By way of example, such grooves could be in the form of two triangles meeting halfway along the plate at their narrow ends, with the opposite ends of the two triangles forming two distinct feed inlets for the groove.

What is claimed is:

1. A bipolar plate for a fuel cell, said plate comprising:
   a first half-plate having an inside face and an outside face,
      the inside face including at least one first groove and at least one second groove that are disposed thereon and spatially separated from each other, and
      the outside face including a first plurality of distribution channels disposed thereon, each of the first plurality of distribution channels having a distal end and a proximal end; and
   a second half-plate having an inside face and an outside face,
      the inside face including at least one first groove and at least one second groove that are disposed thereon and spatially separated from each other and from the first and second grooves on the inside face of the first half-plate, and
      the outside face including a second plurality of distribution channels disposed thereon, each of the second plurality of distribution channels having a distal end and a proximal end,
   wherein the bipolar plate is structured and arranged so that the inside face of the first half-plate is fixedly attached to the inside face of the second half-plate so that, when the half-plates are fixedly attached, the at least one first groove and the at least one second groove on each half-plate provide four discrete channels that are disposed along the inside faces of said half-plates of said bipolar plate,
   each of the four discrete channels having a plurality of orifices that are fluidly coupled to at least one of the distal and the proximal ends of the first and second distribution channels on the outside faces of the half-plate.

2. A plate according to claim 1, wherein each of the first and second grooves in each half-plate is tapered to provide a channel section that decreases in lateral dimension progressively from a first, proximal end at an opening in the half-plate with which it communicates to a second, distal end.

3. A plate according to claim 2, wherein the at least one first and at least one second grooves of each half-plate present substantially triangular shapes that are reversed relative to each other.

4. A plate according to claim 2, wherein at least one of the first and second grooves presents a shape in the form of two oppositely-directed triangles, the opposite ends of the two triangles forming two distinct feed inlets for the groove.

5. A plate according to claim 1, wherein at least one half-plate includes in its inside face a plurality of channels disposed between the at least one first and the at least one second grooves, the channels of the two half-plates co-operating with one another to form a plurality of flow ducts for a cooling fluid.

6. A plate according to claim 1, wherein the half-plates are made of metal.

7. A plate according to claim 6, wherein the half-plates are held one against the other by brazing or by a conductive adhesive.

8. A plate according to claim 1, wherein the half-plates are made of non-metallic material.

9. A plate according to claim 8, wherein the half-plates are held one against the other by conductive adhesive.

10. A plate according to claim 1, wherein each half-plate includes in its inside face a groove forming a housing for a gasket so as to provide sealing between the two half-plates under a clamping force.

11. A plate according to claim 1, wherein the half-plates are identical.

12. A fuel cell including at least one individual cell formed by first and second electrodes separated by an electrolyte disposed between two plates according to claim 1.

13. A fuel cell according to claim 12, the fuel cell being of the proton exchange membrane type.

14. A plate according to claim 1, wherein the first groove and the second groove of each half-plate are adapted to provide an inlet and an outlet for a reaction fluid.

15. A plate according to claim 14, wherein the inlet and the outlet are fluidly coupled via the plurality of orifices and each of the first and second pluralities of distribution channels.

16. A plate according to claim 14, wherein each of the first and second pluralities of distribution channels comprises a plurality of substantially rectilinear portions that are disposed between the inlet and the outlet.

17. A plate according to claim 1, wherein both cooling fluid and reagent fluid are introduced between the inside faces of the half-plates.

18. A plate according to claim 1, wherein each of said first and said second grooves of said first and said second half-plates is structured and arranged to continuously accelerate a fluid from a proximal end of each respective groove to a distal end of each respective groove.

* * * * *